Patented May 9, 1950

2,506,877

UNITED STATES PATENT OFFICE 2,506,877

RECOVERY OF PROTEOLYTIC PROENZYMES

Havard L. Keil, Clarendon Hills, and Richard E. Burgess, Hinsdale, Ill., assignors to Armour and Company, Chicago, Ill., a corporation of Illinois No Drawing. Application October 6, 1945,
Serial No. 620,850

8 Claims. (Cl. 195—66)

This invention relates to the recovery or preparation of proteolytic pro-enzymes or zymogen substances from pancreas, and is particularly concerned with the preparation of such pro-enzymes substantially free of lipase and diastase.

The existence of pro-enzymes or zymogens has long been recognized and it is believed that they occur in nature as compounds of enzymes with other substances. For example, a proteolytic pro-enzyme may be a compound of the enzyme with a protein. The pro-enzyme may be considered as the inactive form of the enzyme or the precursor of the enzyme and, after proper treatment, or "activation," yields the active form of the material which we know as the enzyme. Apparently, the pro-enzyme undergoes in activation a sort of hydrolysis, and one of the decomposition products is the enzyme.

An object of this invention is to provide an improved process for obtaining proteolytic pro-enzymes from pancreas glands. Yet another object is to provide a pro-enzyme composition which is substantially free of lipase and diastase. A further object is to provide a process in which the preparation of the pro-enzyme, substantially free of lipase and diastase, is accomplished through the use of a salt which can be incorporated in food products. Another object is to provide a method of treating pancreas whereby a high yield of proteolytic pro-enzymes can be obtained through the use of a very small operation in which sodium chloride is employed, the latter remaining in the product as a desirable ingredient thereof. A further object is to provide a proteolytic pro-enzyme product substantially free of the lipase flavor and which is highly useful in food product and food manufacturing processes. Other objects and advantages will appear as the details of the process are set out.

We have discovered that a proteolytic pro-enzyme or zymogen, substantially free of lipase and diastase, can be obtained from pancreas glands by mixing ground pancreas with water and dilute hydrochloric acid, or its equivalent, removing the coarse tissue, controlling the pH within specific limits, and then salting with sodium chloride to recover the proteolytic proenzyme substances, the solution or mixture being kept at a temperature below that necessary for the activation of the pancreatic proteolytic pro-enzyme, at least prior to the salting step. We find that once the pro-enzymes are converted to active enzymes, they are no longer completely precipitated with saturation of sodium chloride, and we prefer to keep the mixture at a low non-activating temperature throughout the entire process, even including the salting operation. The temperature should not be so high an to produce inactivation of the enzyme substance at the pH conditions being employed. Using the conditions herein outlined, we prefer to use a temperature below 40° F., and if temperatures above 50° F. or 60° F. be used, a substantial amount of undesired inactivation must be expected. By using the lower temperatures, the yield of enzyme substance is decreased, and consequently the yield of pro-enzymes recovered is increased.

More specifically, the process may be described as follows: Ground hog pancreas is mixed with 2 weights of water, together with 16 to 20 cc. of dilute hydrochloric acid per pound of tissue. The resulting mixture is held for about 24 hours at 32° F., after which it is strained through cheesecloth to remove coarse tissue. The resulting juice shows pH 2.6 when we use 16 cc. of the hydrochloric acid solution per pound of pancreatic material, and pH 1.9 when we use 20 cc. of the hydrochloric acid per pound of pancreatic material. A suitable alkali solution, preferably sodium hydroxide, is then stirred into the crude juice until the pH rises to about 4.5 to 6.0. A pH of 5.0 is preferred. Sodium chloride to saturation (or 36 gms. per 100 cc.) is next stirred in, and the mixture filtered through canvas in the cold. The paste, thus obtained, contains considerable salt crystals and is entirely unactivated.

When the above paste product is activated by letting it stand for a few hours in solution at 40° C. and pH 5.6, or by adding duodenum at this pH and holding for 30 minutes at 40° C., the proteolytic strength usually ranges from 1:8 to 1:12.5. The amount of proteolytic enzyme substances recovered from the crude filtrate by this method or salting corresponds very well to the amount recovered in a filtrate without salting. For example, if 1,000 cc. of crude juice shows an activity of 1:5, after salting and draining, the recovered paste will amount to one-half the original volume and show an activity of about 1:10. This proves no losses in pro-enzymes by salting out, or 100% efficiency. If salting out is carried on at pH 1.9 or pH 2.6, one recovers about one-half of the pro-enzyme content; when the pH is in the neighborhood of 4.5 to 6.0, we recover substantially all of the proteolytic pro-enzymes. The amount of lipase remaining is very low and does not show a characteristic lipase flavor in dairy products; from a practical standpoint, the final product is substantially free of it. The paste contains about 33% moisture and may be used as such or mixed with 25% glycerol, corn syrup, or other innocuous liquids, such as simple sugar syrups, to preserve and prevent activation. Such mixture may be dehydrated in vacuo and will usually test about 1:11 in proteolytic strength.

The pro-enzymes or zymogen products produced as above described are especially valuable for use in cheese making, but may also be used in other fields where the enzymes are desired in the zymogen or inactive form.

The process may be modified considerably and equivalent steps substituted for a number of those already set out. If desired, the ground pancreas may be first extracted with water, filtered, and the juice treated with dilute hydrochloric acid. The juice, after standing sufficiently long to inactivate the lipase, is then neutralized, as above described, and salted out according to the preferred process set out above. The tissue residue can then be treated, dried, and ground to a powder which becomes an important by-product having a substantial potential tryptic strength.

For reducing the pH of the material, we can use instead of the hydrochloric acid, any other acid not poisonous to the enzyme and not poisonous in foods with which the enzyme substances are later to be used.

An example of the above modified method is set out as follows:

Ground pancreas is extracted with 2 volumes of water at 32° F. for about 3 hours. It is then strained through cheesecloth, and dilute hydrochloric acid (20 cc. per pound of pancreas) is added to the juice and allowed to stand for 24 hours to inactivate the lipase. The juice is then neutralized to a pH in the neighborhood of 4.5 to 6.0 and salted out, as already described. The tissue residue is brought to pH 6.0 with NaOH or other suitable base. It is then mixed with 10% of duodenum and dried in vacuo, defatted, and ground to give an active enzyme powder testing 1:50 tryptic strength. By maintaining the mixture at a low temperature prior to the salting-out operation, we find that the pro-enzymes are not activated and that they respond substantially 100% to the sodium chloride saturation treatment. The salt in the final product does not have to be removed, but remains rather as a desirable ingredient of the product. There is, for practical purposes, substantially no lipase or diastase in the preparation, and it will keep well in an unactivated state under refrigeration for considerable periods.

While in the foregoing examples of the process, we have set forth certain acids, ranges of pH, temperatures, and other details as illustrative of one mode in which the invention can be carried out, it will be understood that considerable variation in such details, steps, and sequence of steps, and equivalent treating materials may be employed without departing from the spirit of our invention.

We claim:

1. A method of recovering proteolytic pro-enzymes from pancreas, comprising mixing ground pancreas with water and hydrochloric acid to bring the pH to 1.9–2.6, filtering to remove coarse tissue, adjusting the pH to about 4.5–6, adding sodium chloride substantially to saturation while maintaining a temperature below 50° F. in said mixing, filtering, pH changing, and salting steps, and filtering to recover the paste product containing pancreatic proteolytic pro-enzymes.

2. A method of recovering proteolytic pro-enzymes from pancreas, comprising mixing ground pancreas with water and dilute hydrochloric acid to bring the pH to 1.9–2.6, filtering to remove coarse tissue, bringing the pH of the filtrate to about 4.5 to 6.0, adding sodium chloride substantially to saturation while maintaining a temperature below that necessary for activation of the pancreatic proteolytic pro-enzyme in said mixing, filtering, pH changing, and salting steps, and filtering to recover the paste product containing pancreatic proteolytic pro-enzymes.

3. A method of recovering proteolytic pro-enzymes from pancreas, comprising mixing ground pancreas with water and dilute hydrochloric acid to bring the pH to about 1.9–2.6 and allowing the same to stand at a temperature in the neighborhood of 32° F. to inactivate the lipase, filtering to remove the coarse tissues, adding an alkali to bring the pH to about 4.5 to 6.0, adding sodium chloride substantially to saturation, and filtering the mixture to recover pancreatic proteolytic pro-enzymes.

4. A method of recovering proteolytic pro-enzymes from pancreas, comprising mixing ground pancreas with water and dilute hydrochloric acid to bring the pH to about 1.9–2.6 and allowing the same to stand at a temperature in the neighborhood of 32° F. to inactivate the lipase, filtering to remove the coarse tissues, adding an alkali to bring the pH to about 4.5 to 6.0, adding sodium chloride substantially to saturation, and filtering the mixture at a temperature below that necessary for activation of the pancreatic proteolytic pro-enzyme to recover pancreatic proteolytic pro-enzymes.

5. In a process for obtaining a pancreatic proteolytic mixture of pro-enzymes substantially free of lipase by the use of a salt which can be incorporated in food products, the steps of extracting ground pancreas with water and treating with dilute hydrochloric acid at a pH of about 1.9–2.6 sufficiently long to inactivate the lipase while maintaining the mixture at a temperature below about 40° F., adding sodium hydroxide to raise the pH to about 4.5 to 6.0, adding sodium chloride to saturation, and filtering at a temperature below that necessary for activation of the pancreatic proteolytic pro-enzyme to recover pancreatic proteolytic pro-enzymes.

6. In a process for obtaining a pancreatic proteolytic mixture of pro-enzymes substantially free of lipase and diastase by the use of sodium chloride remaining in the final product, the steps of treating ground pancreas with water and dilute hydrochloric acid to bring the pH to about 1.9–2.6 and at a temperature below about 40° F. for a period of about 24 hours, adding sodium hydroxide to raise the pH to about 4.5 to 6.0, introducing sodium chloride to saturation, and filtering to recover solids containing pancreatic proteolytic pro-enzymes.

7. A process for obtaining a pancreatic proteolytic mixture of pro-enzymes, comprising treating ground pancreas with 2 weights of water together with from 16 to 20 cc. of dilute hydrochloric acid per pound of tissue, maintaining the mixture at a temperature below about 40° F. sufficiently long to inactivate the lipase, filtering to remove the coarse tissue, adding an alkali to raise the pH to about 4.5 to 6.0, adding sodium chloride to saturation, and filtering the mixture at a temperature below that necessary for activation of the pancreatic proteolytic pro-enzyme to recover pancreatic proteolytic pro-enzymes.

8. A process for obtaining a pancreatic proteolytic mixture of pro-enzymes, comprising mixing pancreas with substantially 2 weights of water per pound of tissue, treating with from 16 to 20 cc. of dilute hydrochloric acid per pound of tissue to bring the pH to about 1.9–2.6 and at a temperature below about 40° F. for a period sufficiently long to inactivate the lipase, filtering to remove the coarse tissue, adding sodium hydroxide to bring the pH to about 4.5 to 6.0, stirring in sodium chloride to saturation, and filtering at a temperature below that necessary for activation of the pancreatic proteolytic pro-enzyme to recover pancreatic proteolytic pro-enzymes.

HAVARD L. KEIL.
RICHARD E. BURGESS.

REFERENCES CITED

The following references are of record in the file of this patent:

UNITED STATES PATENTS

| Number | Name | Date |
|---|---|---|
| 2,313,875 | Jansen | Mar. 16, 1943 |

FOREIGN PATENTS

| Number | Country | Date |
|---|---|---|
| 20,263 | Great Britain | of 1894 |

OTHER REFERENCES

Tauber, "Experimental Enzyme Chemistry," 1936, pages 37, 38, 40, 41, 42, 47.

Kunitz et al., Jr. Gem. Physiology, vol. 18 (1934–35), pages 433, 434, 435, 437, 438, 440.

Science, Jan. 24, 1941, page 9.